United States Patent Office 3,657,313
Patented Apr. 18, 1972

3,657,313
PREPARATION OF 1-CYANOCYCLOBUTENE FROM 1,2-DICYANOCYCLOBUTANE
David M. Gale, Chalfonte, Wilmington, Del., assignor to E. I. du Pont de Nemours and Company, Wilmington, Del.
No Drawing. Filed June 11, 1969, Ser. No. 832,457
Int. Cl. C07c 121/48
U.S. Cl. 260—464
19 Claims

ABSTRACT OF THE DISCLOSURE

Processes for preparing 1-cyanocyclobutene by contacting 1,2-dicyanocyclobutane with certain bases or solid basic oxidation catalysts. Exemplary of bases are metals such as lithium, sodium and potassium, their oxides, hydroxides, carbonates, hydrides and amides. Exemplary of solid basic oxidation catalysts are those that catalyze oxidation or oxydehydrogenation reactions as for example the oxides of magnesium, zinc, barium, calcium; the cyanides of sodium, potassium, calcium; and the like.

BACKGROUND OF THE INVENTION

Field of the invention

This invention relates to a process for preparing 1-cyanocyclobutenes, particularly 1-cyanocyclobutene itself. These products are useful as monomers and comonomers in addition polymerizations to provide polymers that are valuable items of commerce.

Prior art

U.S. Patent 3,347,902 describes the pyrolysis of 1,2-dicyanocyclobutanes over selected catalysts to give 2-cyano-1,3-butadiene (cyanoprene) or appropriately substituted derivatives thereof. The process is stated to involve the removal of hydrogen cyanide accompanied by ring opening of the starting material. In addition, as reported in that patent, pyrolysis of 1,2-dicyanocyclobutane in the absence of a catalyst gives acrylonitrile.

U.S. 3,347,902 discloses that the catalytic pyrolysis of 1,2-dicyanocyclobutanes can take place at 200–600° C. and at reactant-to-catalyst contact times of 0.01–50 seconds. In the specific examples described in this patent, temperatures of 300–500° C. and contact times of 0.05–4 seconds in successful experiments are reported. There is no mention of the formation of useful products other than cyanoprene.

DESCRIPTION OF THE INVENTION

It has now been found that if the residence time of the products, i.e., the time that the products of the reaction remain in the reaction zone under the reaction conditions, is carefully controlled and in particular is kept below a certain maximum value, which in turn depends on the temperature, reaction of 1,2-dicyanocyclobutanes in contact with the solid, basic oxidation catalysts of U.S. 3,347,902 can be made to give commercially practical quantities of an entirely different class of useful products not disclosed or taught by the patent, namely, the corresponding 1-cyanocyclobutenes. In this novel process HCN is split off from the starting material and the saturated ring changes to an unsaturated ring but does not open:

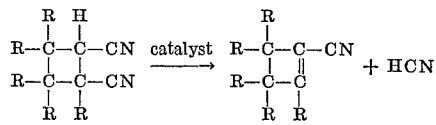

In the above equation the R groups are hydrogen or lower alkyl of one to six carbon atoms.

It has also been found that under similarly carefully controlled residence times, reaction of 1,2-dicyancyclobutanes with certain bases can be made to yield the same 1-cyanocyclobutenes. In this embodiment of the process the CN group that is eliminated ends up as a cyanide salt, the cation in this salt being the cation of the base or a cation derived from the base, depending on the exact nature of the base. When the base is a metal hydroxide, the process can be represented as follows:

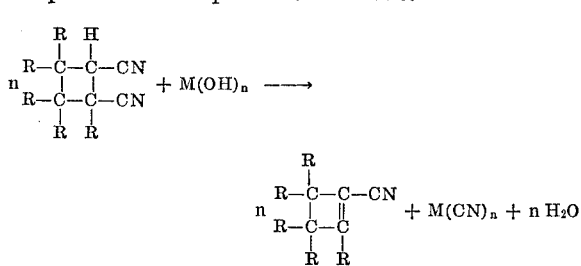

In the above equation M is a metal and $n$ is its valence. The corresponding equations where the bases are other than metal hydroxides will be readily apparent to one skilled in the art.

It will be evident to one skilled in the art that when the reactant and the products are in the vapor phase, a convenient way to control the residence time is to control the contact time, i.e., the average time that the reactant, or more precisely, the reactant/product mixture, is in contact with the catalyst or base.

The process of the present invention, in its vapor-phase embodiment, comprises reacting a 1,2-dicyanocyclobutane of the formula

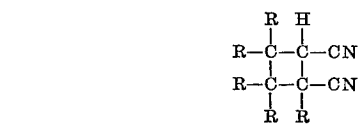

wherein the R groups are the same or different and are hydrogen or lower alkyl, in contact with a basic solid catalyst at 50–450° C. or with a base at 0–400° C., at 0.001–150 mm. partial pressure of the reactant, and at a contact time that has a maximum value that varies inversely with the temperature.

As is also known to one skilled in the art, the concept of contact time, discussed above, does not apply to liquid-phase/solid-phase heterogeneous reactions or liquid-phase homogeneous reactions, or at best is very hard to apply or calculate with certainty. Cf., for example, Emmett, "Catalysis Then and Now," Part II, page 10 (Franklin, 1965). In addition, the concept of partial pressure has little meaning in nonvapor-phase systems. The residence time of any desired product, however, can be controlled by controlling the rate at which it is removed from the reaction mixture.

A convenient and well-known way of removing a material from a reaction mixture or reaction zone is to distill it. The rate of distillation is increased by raising the temperature and/or lowering the pressure. It is possible, therefore, to keep the residence time of a desired product suitably short by operating at a low enough pressure that the product volatilizes essentially immediately at the temperature of the system once it is formed.

The process of the present invention, in its liquid-phase embodiment, comprises reacting a 1,2-dicyanocyclobutane as formulated above with a base at 0–400° C. and removing rapidly from the reaction mixture the 1-cyanocyclobutene thus formed.

As stated above, a critical feature of the vapor-phase process is that the average total contact time between the reactant and the catalyst must be no greater than a certain value, which in turn depends upon the temperature. Maximum operable contact times, $t$, are defined by the equation (1) $$t = 1.37 \times 10^{-13} e^{\left(\frac{16,800}{T_k}\right)}$$

where $T_k$ is the absolute temperature, i.e., the temperature in degrees centigrade plus 273.16°, $e$ is the base of natural logarithms, that is, a numerical constant approximating 2.72, and $t$=time in seconds. Another way of expressing the same equation is (2) $$t = 1.37 \times 10^{-13} \exp\left(\frac{16,800}{T_k}\right)$$

The best conversions and yields of 1-cyanocyclobutenes are obtained at temperatures of 200–350° C. and 0.1–80 mm. partial pressure of the reactant and at a maximum contact time defined by the equation (3) $$t = 1.86 \times 10^{-14} \exp\left(\frac{16,800}{T_k}\right)$$

wherein the terms are defined as above, and these conditions are therefore preferred.

Utilizing Equation 1, there is given below maximum contact time in seconds for various temperatures.

| Temp. ° C.: | Maximum contact time, seconds |
| --- | --- |
| 200 | 359 |
| 250 | 11.9 |
| 300 | 0.73 |
| 350 | 0.073 |
| 400 | 0.0099 |

Catalysts that are particularly effective in the process of the invention are those that are basic or neutral rather than acidic, preferably basic, and those that catalyze oxidation or oxydehydrogenation reactions are particularly effective. Examples are catalysts containing magnesium oxide, zinc oxide, barium oxide, calcium oxide, sodium cyanide, potassium cyanide, rubidium cyanide, calcium cyanide, strontium cyanide, sodium acetate, potassium propionate, magnesium isobutyrate, calcium pivalate, sodium 2-ethylhexanoate, copper oxide, iron oxide, nickel oxide, chromium oxide, copper chromite, antimony and uranium oxides, antimony and iron oxides, antimony and manganese oxides, antimony and thorium oxides, antimony and cerium oxides, and catalysts containing any two metal oxides in combination with antimony oxide. The foregoing catalysts can also be promoted with up to about 10% by weight of the active catalyst of an oxide of at least one of the following elements: rhenium, niobium, silver, thorium, tungsten, lead, bismuth, palladium, iridium, zirconium, molybdenum, thallium, gallium, tantalum, platinum, and boron. Also usable as promoters are up to about 10% by weight of a hydroxide, carbonate, or cyanide of a metal from Group I–B, II–B, III–B, IV–B, V–B, VI–B, or VIII of the periodic table. The periodic table referred to is that shown, for example, in Deming's "General Chemistry," 5th ed., page 156 (Wiley, 1944). Metals from these groups in their reduced forms may also serve as promoters. Such "promoters" will normally be limited to compounds and elements of the types just defined that do not show significant catalytic activity by themselves. Other active catalysts for the process are bismuth molybdate, bismuth phosphomolybdate, antimony bismuth molybdate, antimony bismuth phosphomolybdate, and bismuth phosphotungstate. The latter group of bismuth-containing catalysts may also be modified with oxides of Group VIII metals.

For economic reasons and because by and large they provide relatively high conversions, compositions in which the catalytic species is a Group II–A metal oxide, a Group II–B metal oxide, or a Group I–A metal cyanide are preferred. Group I–A and Group II–A metals are the alkali metals and the alkaline-earth metals, respectively.

Operable bases include the following:

(a) Alkali metals, alkaline-earth metals, i.e., the metals of Groups I–A and II–A, and mixtures or alloys of such metals with each other.

(b) Oxides of alkali metals and hydroxides and carbonates of alkali metals and alkaline-earth metals.

(c) Hydrides and amides of alkali metals and alkaline-earth metals.

(d) Hydrocarbyl derivatives and hydrocarbyloxides of alkali metals in which the hydrocarbyl groups contain up to 12 carbon atoms and are free of ethylenic and acetylenic unsaturation.

(e) Organic amines having $pK_b$'s of up to about 4.8, tetrahydrocarbylammonium hydroxides, and tetrahydrocarbylphosphonium hydroxides, in all of which the hydorocarbyl groups are the same or different, contain up to 12 carbon atoms, and are free of ethylenic and acetylenic unsaturation.

Examples of operable bases are lithium, sodium, potassium, cesium, magnesium, calcium, barium, sodium-potassium alloy, potassium-calcium solution, lithium oxide, sodium oxide, rubidium oxide, sodium hydroxide, potassium hydroxide, cesium hydroxide, calcium hydroxide, barium hydroxide, commercially available mixtures of hydroxides such as soda lime, sodium carbonate, calcium carbonate, magnesium carbonate, lithium hydride, potassium hydride, cesium hydride, beryllium hydride, calcium hydried, strontium hydride, sodium amide, potassium amide, calcium amide, butyllithium, phenylsodium, benzylpotassium, dodecylsodium, triphenylmethylsodium, cyclopentadienylcesium, fluorenylpotassium, sodium methoxide, rubidium ethoxide, potassium tert-butoxide, lithium phenoxide, sodium tolyloxide, sodium dodecyloxide, potassium 2-ethylhexyloxide, lithium 2-naphthyloxide, dimethylamine, triethylamine, pentylamine, cyclohexylamine, piperidine, morpholine, dimethyloctylamine, N-methylhexamethylenimine, dimethyldecylamine, dodecylamine, 2,5-dimethylpyrrolidine, diethylisobutylamine, tetraethylammonium hydroxide, benzyltrimethylammonium hydroxide, tetraisopentylammonium hydroxide, didodecyldiethylammonium hydroxide, butyldimethyl(phenyl)ammonium hydroxide, N,N-dimethylpiperidinium hydroxide, cyclohexyltrimethylammonium hydroxide, tetrabenzylphosphonium hydroxide, tetra(1-naphthyl)phosphonium hydroxide, ethyltriphenylphosphonium hydroxide, and isobutylethylmethylpropylphosphonium hydroxide.

Because of their availability, ease of handling, and effectiveness, the alkali-metal and alkaline-earth-metal hydroxides and carbonates and the alkali-metal oxides are preferred bases, especially the alkali-metal hydroxides.

Some compounds that are operable bases in the present invention are disclosed as catalysts in U.S. 3,347,902.

The catalyst or base may be used alone or on a support such as asbestos, charcoal, silica, alumina, silica-alumina, alumina-magnesia, titania, zirconia silicon carbide, or zirconium. The support can constitute up to about 90% by weight of the catalyst or base composition. Before use, catalysts may be heat-treated or calcined at an elevated temperature. Such treatment often improves the attrition resistance of a catalyst and is particularly useful in regenerating spent catalysts. Many of the operable catalysts and bases are available commercially. Others can be made by methods well known to one skilled in the art.

The process can be carried out in any of a number of ways, known to those skilled in the art, for carrying out such reactions. The reactant can be brought into contact with the catalyst or base in the liquid phase or the vapor phase. Vapor-phase techniques are preferred, since they are easier to use and since under the preferred operating conditions most of the reactants will be in the gaseous state. In one well-known method of operation, the reactant in liquid or solid form can be added portionwise to the catalyst or base at the desired temperature in a vertical tubular reactor, either alone under reduced pressure or in a stream of an inert gas at atmospheric or reduced pressure. Alternatively, the vaporized reactant, diluted with an inert gas carrier, can be passed over or through the catalyst or base. The catalyst or base can be used in such a process as a powder in the form of fluidized particles, as a fixed bed, or as a counter-current or over-current bed or particles. Alternatively, the catalyst or base can be used in the form of pellets. Frequently, spent base as well as product is removed continuously from the hot zone.

Among the inert gaseous diluents that can be used in the foregoing methods of operation are air, oxygen, nitrogen, nitrogen oxide, steam, carbon dioxide, ammonia, hydrogen, and the like.

Alternatively, and particularly when a base is used, the process can be carried out in a liquid system, in which the 1,2-dicyanocyclobutane is brought into contact with a solution or suspension of the base (or catalyst) in an inert solvent or diluent, usually with suitable agitation. Useful solvents and diluents are hydrocarbons such as hexane, benzene, pentane, mineral oil, biphenyl, low-molecular-weight hydrocarbon polymers; ethers, such as ethyl ether, phenyl ether, 1,2-dimethoxyethane, 2-ethoxyethyl ether, tetrahydrofuran, and low-molecular-weight ether resins; silicone oils; fluorocarbon oils; alcohols and glycols, such as methyl alcohol, ethyl alcohol, ethylene glycol, diethylene glycol, and glycerol. When the base is a liquid, such as a liquid amine, an excess of this material can serve as solvent or diluent. It will be obvious some materials can function as either gaseous or liquid diluents, depending on the temperature and pressure of the reaction system. For example, hexane could serve as a liquid diluent in a low-temperature reaction or as a gaseous diluent in a high-temperature process. In the foregoing embodiment, and in those of the following two paragraphs, the 1-cyanocyclobutene product is removed from the reaction mixture as rapidly as possible, usually by distillation as it is formed, and preferably under reduced pressure to facilitate the distillation. This aspect of the process becomes increasingly important with increasing reaction temperature. Accordingly the preferred liquid media are those of relatively low volatility, whose boiling points are such that they substantially remain behind when the 1-cyanocyclobutene product is removed by volatilization.

In another method of operation, a suitably subdivided solid base can be impregnated with the 1,2-dicyanocyclobutane from an inert solvent, followed by evaporation of the solvent. The impregnated base can then be heated to the desired reaction temperature and the 1-cyanocyclobutene can be recovered by conventional means.

In still another method of carrying out the process, a salt of the 1,2-dicyanocyclobutane can be formed by reaction with a strong base under mild conditions and can be isolated in crude or in pure form. For example, sodium 1,2-dicyanocyclobutanide can be formed in this manner from 1,2-dicyanocyclobutane and sodium amide. The salt-forming step can be carried out at temperatures as low as about $-80°$ C., but is usually carried out at about 0–40° C.

The ratio of the amount of 1,2-dicyanocyclobutane reactant to the amount of catalyst or base is not critical; one skilled in the art will have no problem in deciding on suitable amounts once he has determined which of the several possible methods of operation he wants to use. In liquid-phase, batch operations, in which the material brought into contact with the 1,2-dicyanocyclobutane is usually a base, the amount of base will usually be at least equivalent to the amount of 1,2-dicyanocyclobutane. In order to insure as complete a conversion as possible, an excess of base up to about 10 equivalents of base per mole of 1,2-dicyanocyclobutane will normally be used. An upper limit on the amount of base is imposed only by considerations such as space available in the reactor, and 100-fold or even greater excesses can be used.

In continuous or semi-continuous operations, the amount of catalyst or base in contact with the 1,2-dicyanocyclobutane at any one time will of course be a large excess, and in relatively short, semi-continuous runs the catalyst or base may still be more than equivalent to the total amount of 1,2-dicyanocyclobutane passed through or over it. There is obviously no point in continuing passage of organic reactant over or through a base once all the base has reacted. With an efficient catalyst, the flow can be continued until many times an equivalent amount of 1,2-dicyanocyclobutane reactant has been brought into contact with the catalyst.

1,2-dicyanocyclobutane is usually formed preparatively as a mixture of cis- and trans-isomers, and such mixtures of the two isomers can be used in the process. Alternatively, either pure isomer can be used. The same is true of the alkyl-substituted 1,2-dicyanocyclobutanes.

EMBODIMENTS OF THE INVENTION

There follow some non-limiting examples which illustrate the invention in detail.

Example 1.—A vertical quartz tube, 50 cm. long and 2.5 cm. in diameter, packed for 20 cm. of its length with 1:1 (by weight) ZnO:MgO catalyst, was heated by a cylindrical furnace 30 cm. long at about 400° C. and at 1 mm. pressure for 1 hr. to remove moisture and absorbed gases. The heated zone was the space occupied by the catalyst and an empty space 10 cm. long above the catalyst. The temperature was recorded by a thermocouple inserted in a well at the top of the catalyst bed. While the temperature and pressure were held at 300–301° C. and 0.5 to 1.5 mm., 10 g. of molten 1,2-dicyanocyclobutane was added dropwise from the top of the tube onto the catalyst bed over a period of 1 hr. and 15 minutes. The average contact time, calculated from the volume of the reaction zone, the amount of 1,2-dicyanocyclobutane, time required for addition, temperature, and pressure, was about 0.07 second. The effluent materials were collected in a series of traps cooled at about $-78°$ C. (solid carbon dioxide/acetone). Quantitative analysis by gas chromatography showed that 1-cyanocyclobutene was obtained in 16.7% conversion. In this and subsequent examples, percent conversion is defined as 100 times moles of 1-cyanocyclobutene produced divided by moles of 1,2-dicyanocyclobutane charged.

By essentially the procedure of Example 1, other catalysts were used to convert 1,2-dicyanocyclobutane to 1-cyanocyclobutene. These runs are summarized in the following table. Ten g. of 1,2-dicyanocyclobutane was used in each of Examples 4–8; 5 g. in Examples 2, 3, and 9.

| Example | Catalyst | Hr.:min. | Temp., ° C. | Press., mm. | Percent conv. | Contact Time in seconds |
|---|---|---|---|---|---|---|
| 2 | ZnO:MgO (3:1) | [1] 2:00 | 225±2 | [1] 0.1 | 1.7 | 0.25 |
| 3 | NaCN pellets | [1] 2:00 | 225±2 | [1] 0.1 | 4.0 | 0.25 |
| 4 | Al$_2$O$_3$ (Alcoa H 151) | 3:30 | 296–300 | 0.6–0.8 | 2.3 | 0.13 |
| 5 | Fe$_2$O$_3$:ZnO:MgO (5:5:1) | 4:15 | 298–304 | 0.3–0.7 | 1.5 | 0.11 |
| 6 | ZnO:BaO | 2:15 | 297–300 | 0.6–0.7 | 10.3 | 0.11 |
| 7 | ZnO | 4:00 | 300 | 1.2 | 3.0 | 0.25 |
| 8 | ZnO:CuO:silica:diatomaceous earth (60:30:5:5) | 2:00 | 300–308 | 0.6–1.4 | 1.1 | 0.11 |
| 9 | NaCN pellets | 1:30 | 300 | 1.5 | 1.4 | 0.24 |

[1] Ca.

Example 10.—The procedure of Example 1 was essentially repeated with a 1:4 ZnO:MgO catalyst, and an 18.2% conversion of 1,2-dicyanocyclobutane to 1-cyanocyclobutene was realized. Before the start of the run, and essentially as a part of its preparation, the catalyst had been calcined by being heated at about 400° C. for about 18 hours in a moderate stream of air at atmospheric pressure. The catalyst was now left in the reactor, and a series of additional, consecutive runs was made with it. Ten grams of 1,2-dicyanocyclobutane was used in each run. The catalyst was recalcined in the reactor before some of the runs, and was not pretreated in any way before other runs. The details are summarized in the following table. The runs, including the one mentioned above, are listed in chronological order.

By essentially the procedure of Example 24, except that the 1,2-dicyanocyclobutane was not added all at once, soda lime and powdered sodium hydroxide were used in separate runs to convert 1,2-dicyanocyclobutane to 1-cyanocyclobutene. These experiments are summarized in the following table.

| Ex. | Temp., °C. | DCCB[1] added Weight, g. | Time, min. | Base, g. | Diluent ml. | Percent conversion |
|---|---|---|---|---|---|---|
| 25 | 200 | 15.6 | 10 | 20 mesh soda lime, 325. | Mineral oil, 550. | 19 |
| 26 | 200 | 10 | 12 | Powdered NaOH, 15. | Mineral oil, 200. | 5 |

[1] 1,2-dicyanocyclobutane.

| Run | Catalyst pretreatment | Run conditions Time of add'n., hr.:min. | Temp., °C. | Press., mm. | Percent conv. | Contact time in seconds |
|---|---|---|---|---|---|---|
| A | As above | 3:0 | 301–305 | 0.4–1.2 | 18.2 | 0.13 |
| B | None | 3:0 | 300–311 | 0.5–1.0 | 8.3 | 0.12 |
| C | do | 2:25 | 285–300 | 1–7 | 1.4 | 0.52 |
| D | Recalcined ca. 18 hrs. at 400° C./air | 1:50 | 297–300 | 0.8–1.4 | 17.3 | 0.10 |
| E | Recalcined ca. 64 hrs. at 400° C./air | 1:55 | 298–303 | 0.6–0.9 | 23.7 | 0.08 |

Example 11.—A vertical quartz tube, 50 cm. long and 2.5 cm. in diameter, packed for 20 cm. of its length with 8-mesh soda lime, was heated by a cylindrical furnace 30 cm. long at 200° C. for two hours to remove water and absorbed gases. A moderate stream of air was passed through the tube during this time. The heated zone was the space occupied by the soda lime and an empty space 10 cm. long above it. While the temperature and pressure were held at 198–216° C. and 0.5–2 mm., 10 g. of molten 1,2-dicyanocyclobutane was added dropwise from the top of the tube onto the soda lime over a period of two hours. The average contact time, calculated from the amount of 1,2-dicyanocyclobutane, time required for addition, volume of the reaction zone, temperature, and pressure, was about 0.13 second. The effluent materials were collected in a series of traps cooled at about −78° C. (solid carbon dioxide/acetone). Quantitative analysis by gas chromatography showed that 1-cyanocyclobutene was obtained in 32.4% conversion.

By essentially the procedure of Example 11, other bases were used to convert 1,2-dicyanocyclobutane to 1-cyanocyclobutene. These runs are summarized in the following table. Three g. of 1,2-dicyanocyclobutane was used in Example 18; 5 g. in all the other examples. The time of addition was about two hours and the pressure about 1 mm. in each run.

| Example | Reagent | Temp., °C. | Percent conv. | Contact time |
|---|---|---|---|---|
| 12 | Soda lime, 20 mesh | 175 | 21 | 0.28 |
| 13 | do | 200 | 43 | 0.26 |
| 14 | do | 225 | 42 | 0.25 |
| 15 | do | 250 | 36 | 0.23 |
| 16 | do | 275 | 30 | 0.22 |
| 17 | NaOH pellets | 225 | 38 | 0.27 |
| 18 | "Ascarite"[1] | 225 | 59 | 0.41 |
| 19 | Girdler G-64[2] | 175 | 5 | 0.27 |
| 20 | do | 200 | 14 | 0.26 |
| 21 | do | 225 | 22 | 0.25 |
| 22 | do | 275 | 22 | 0.22 |
| 23 | do | 300 | 18 | 0.21 |

[1] Sodium hydroxide on asbestos.
[2] A chrome- and potassium-promoted iron catalyst which analyzes for about 1:1 KOH:Fe₂O₃ containing a few percent Cr₂O₃.

Example 24.—To a stirred suspension of 7.5 g. of molten 85% potassium hydroxide in 100 ml. of mineral oil ("Nujol"), heated at 180° C. and maintained at about 1 mm. pressure, was added 5.3 g. of 1,2-dicyanocyclobutane in a single portion. 1-cyanocyclobutene distilled rapidly (essentially immediately) as it was formed. It and other volatile materials were collected in a series of traps at about −78° C. Quantitative analysis by gas chromatography showed that 1-cyanocyclobutene was obtained in 16.6% conversion.

Example 27

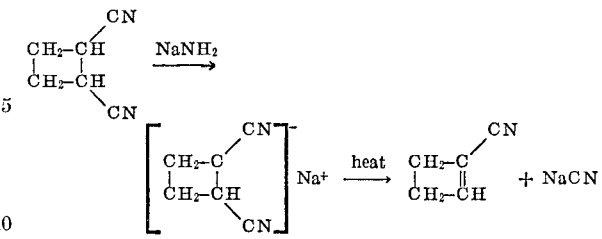

The monosodium salt of 1,2-dicyanocyclobutane was prepared by adding 10.6 g. of molten 1,2-dicyanocyclobutane dropwise over three minutes to a stirred suspension of freshly prepared sodium amide (4 g.) in 200 ml. of dry tetrahydrofuran at 25–29° C. An orange-brown color appeared after the first few drops were added; this color change showed that the sodium salt was formed rapidly. De-aerated mineral oil (100 ml.) was added, and volatile materials (essentially tetrahydrofuran) were removed in a stream of dry nitrogen at room temperature. The residual mixture was heated to 204° C. over one hour at 1 mm. and held under these conditions for 30 minutes. During this time 1-cyanocyclobutene was formed and distilled rapidly (essentially immediately) as it was formed. It and over volatile materials were collected in a series of traps at −78° C. Quantitative analysis by gas chromatography confirmed that 1-cyanocyclobutene was obtained.

Example 28.—A solution of 100 g. of 1,2-dicyanocyclobutane in 900 ml. of methylene chloride was combined with 1313 g. of dry 4-mesh soda lime, and the mixture was allowed to stand overnight. The solvent was removed on a rotary evaporator at 40° C., the last traces being removed under reduced pressure down to about 1 mm. The system was evacuated to 1–2 mm. and heated in a mantle at 200–300° C. (temperature of solid 102–171° C.) for a total of 6 hours. During this time 1-cyanocyclobutene was formed and distilled rapidly as it was formed. It and other volatile materials were collected in a series of traps at −78° C. 1-cyanocyclobutene of 95% purity was obtained (7.7 g.; 10.1% conversion).

Since obvious modifications and equivalents in the invention will be evident to those skilled in the chemical arts, I propose to be bound solely by the appended claims.

The embodiments of the invention in which an exclusive property or privilege is claimed are defined as follows:

1. The process of contacting a reactant of the formula

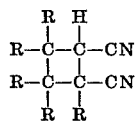

wherein the R groups, alike or different, are hydrogen or alkyl of 1 to 6 carbon atoms, with a basic solid catalyst at a temperature range of from 50–450° C. wherein the maximum contact time between the reactant/product mixture and the catalyst is determined by the equation $$t = 1.37 \times 10^{-13} e^{\left(\frac{16,800}{T_k}\right)}$$

where $T_k$ is the absolute temperature, $e$ is the base of natural logarithms and $t$ is time in seconds, the product having the formula

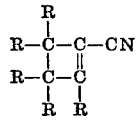

wherein the R groups are as defined above.

2. The process of claim 1 wherein the temperature range is 200–350° C. and the maximum contact time is determined by the equation $$t = 1.86 \times 10^{-14} e^{\left(\frac{16,800}{T_k}\right)}$$

where the values of $t$, $e$ and $T_k$ are as given in claim 1.

3. The process of claim 1 wherein the reactant is 1,2-dicyanocyclobutane.

4. The process of claim 1 wherein the basic solid catalyst is selected from the group consisting of a Group II–A metal oxide, a Group II–B metal oxide and a Group I–A metal cyanide.

5. The process of claim 1 wherein the catalyst is ZnO:MgO in 1:1 weight ratio.

6. The process of claim 1 wherein the catalyst is ZnO:MgO in 1:4 weight ratio.

7. The process of claim 1 wherein the catalyst is ZnO:BaO.

8. The vapor phase process of contacting 1,2-dicyanocyclobutane with ZnO:MgO at about 300° C. for a contact time no longer than 0.73 second to produce 1-cyanocyclobutene.

9. The process of contacting a reactant of the formula

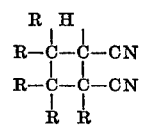

wherein the R groups, alike or different, are hydrogen or alkyl of 1 to 6 carbon atoms, with a base at a temperature range of from 0–400° C. wherein the maximum contact time between the reactant/product mixture and the base is determined by the equation $$t = 1.37 \times 10^{-13} e^{\left(\frac{16,800}{T_k}\right)}$$

where $T_k$ is the absolute temperature, $e$ is the base of natural logarithms and $t$ is the time in seconds, the product having the formula

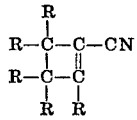

wherein the R groups are as defined above.

10. The process of claim 9 wherein the temperature range is 150–225° C. and the maximum contact time is determined by the equation $$t = 1.86 \times 10^{-14} e^{\left(\frac{16,800}{T_k}\right)}$$

where the values of $t$, $e$ and $T_k$ are as given in claim 9.

11. The process of claim 9 wherein the reactant is 1,2-dicyanocyclobutane.

12. The process of claim 9 wherein the base is selected from the group consisting of Group I–A and II–A metal hydroxides and carbonates and Group I–A metal oxides.

13. The process of claim 9 in which the base is soda lime.

14. The process of claim 9 in which the base is sodium hydroxide.

15. The vapor phase process of contacting 1,2-dicyanocyclobutane with at least a stoichiometric quantity of sodium hydroxide, based on said 1,2-dicyclobutane at a temperature range of 150–225° C. for a contact time no longer than 59.2 seconds to produce 1-cyanocyclobutene.

16. The liquid phase process of contacting a reactant of the formula

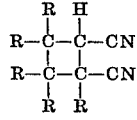

where the R groups, alike or different, are hydrogen or alkyl of 1 to 6 carbon atoms, with a base at a temperature range of 0–400° C. in the presence of an inert liquid solvent which does not react with either the reactant or resultant product at the stated temperature range and removing the product essentially immediately once it is formed by distillation, the product having the formula

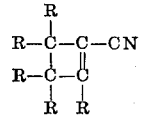

wherein the R groups are as defined above.

17. The process of claim 16 wherein the pressure is about 1 mm.

18. The liquid phase process of contacting a reactant of the formula

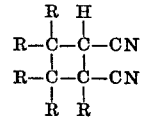

wherein the R groups, alike or different, are hydrogen or alkyl of 1 to 6 carbon atoms, with a basic solid catalyst at a temperature range of 50–450° C. in the presence of an inert liquid solvent which does not react with either the reactant or resultant product at the stated temperature range and removing the product essentially immediately once it is formed by distillation, the product having the formula
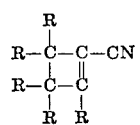
wherein the R groups are as defined above.
19. The process of claim 18 wherein the pressure is about 1 mm.
References Cited
UNITED STATES PATENTS
3,325,529  6/1967  Greene et al. _____ 260—464
3,347,902  10/1967  Grasselli et al. \_\_\_\_ 260—465.9
JOSEPH P. BRUST, Primary Examiner

PO-1050
(5/69)

UNITED STATES PATENT OFFICE
CERTIFICATE OF CORRECTION

Patent No. 3,657,313        Dated April 18, 1972

Inventor(s) David M. Gale

It is certified that error appears in the above-identified patent and that said Letters Patent are hereby corrected as shown below:

Col. 4, line 56, insert a comma after "zirconia".

Col. 6, in the table at the bottom of the column, the pressure in each of Examples 2 and 3 should be changed from "0.1" to -- 1.0 --.

Col. 8, line 59, change "over" to -- other --.

Claim 15, line 3, change "1,2-dicyclobutane" to -- 1,2-dicyanocyclobutane --.

Signed and sealed this 10th day of April 1973.

(SEAL)
Attest:

EDWARD M. FLETCHER, JR.
Attesting Officer

ROBERT GOTTSCHALK
Commissioner of Patents